United States Patent [19]
Berkowitz et al.

[11] 3,755,627
[45] Aug. 28, 1973

[54] PROGRAMMABLE FEATURE EXTRACTOR AND SPEECH RECOGNIZER

[75] Inventors: Sidney Berkowitz, Silver Spring, Md.; James R. Carlberg, McLean, Va.

[73] Assignee: The United States of America as represented by the Secretary of the Navy, Washington, D.C.

[22] Filed: Dec. 22, 1971

[21] Appl. No.: 210,803

[52] U.S. Cl. .................. 179/1 SA
[51] Int. Cl. .................. G10l 1/02
[58] Field of Search .................. 179/1 SA, 15.55 R; 324/77 B, 77 E; 340/148

[56] References Cited

UNITED STATES PATENTS

| | | | |
|---|---|---|---|
| 3,588,363 | 6/1971 | Herscher | 179/1 SA |
| 3,679,830 | 7/1972 | Uffelman | 179/1 SA |
| 3,395,249 | 7/1968 | Clapper | 179/1 SA |
| 3,166,640 | 1/1965 | Dersch | 179/1 SA |
| 3,445,594 | 5/1969 | Kusch | 179/1 SA |

*Primary Examiner*—Kathleen H. Claffy
*Assistant Examiner*—Jon Bradford Leaheey
*Attorney*—R. S. Sciascia et al.

[57] ABSTRACT

A spoken word is analyzed to determine its power spectrum density and slope-intensity product. The recognizer then identifies the word by its unique density and slope-intensity characteristic. The analysis is accomplished through bandpass filters and differentiators which generate signals corresponding to the power spectrum density and slope-intensity product and by a bank of threshold gates which generates binary signals when the power density and the slope-intensity signals are above preset threshold levels. The threshold signals produced are processed through a logic system which indicates which word has been spoken when a unique combination of threshold signals corresponding to a particular word have been triggered.

14 Claims, 23 Drawing Figures

INVENTORS
SIDNEY BERKOWITZ
JAMES R. CARLBERG

BY

ATTORNEY

Buffer Amplifier Outputs for "Two"

Buffer Amplifier Outputs for "Three"

INVENTORS
SIDNEY BERKOWITZ
JAMES R. CARLBERG

BY [signature]
ATTORNEY

INVENTORS
SIDNEY BERKOWITZ
JAMES R. CARLBERG

BY [signature]
ATTORNEY

INVENTORS
SIDNEY BERKOWITZ
JAMES R. CARLBERG

BY D. L. Hodges
ATTORNEY

Buffer Amplifier Outputs for "Nine"

INVENTORS
SIDNEY BERKOWITZ
JAMES R. CARLBERG

BY [signature]
ATTORNEY

INVENTORS
SIDNEY BERKOWITZ
JAMES R. CARLBERG

BY [signature]
ATTORNEY

INVENTORS
SIDNEY BERKOWITZ
JAMES R. CARLBERG

BY [signature]
ATTORNEY

INVENTORS
SIDNEY BERKOWITZ
JAMES R. CARLBERG

BY [signature]
ATTORNEY

INVENTORS
SIDNEY BERKOWITZ
JAMES R. CARLBERG

BY [signature]
ATTORNEY

PROGRAMMABLE FEATURE EXTRACTOR AND SPEECH RECOGNIZER

The invention described herein may be manufactured and used by or for the Government of the united States of America for Governmental purposes without the payment of any royalties hereon or therefor.

PRIOR ART

The prior art includes many systems for recognizing spoken words. These systems rely to a large extent on power spectrum analysis but do not consider the slope-intensity characteristic of the spoken sound.

This invention uses both the information derived from the power spectrum analysis of the spoken word and from the slope-intensity and formant characteristics of the spoken sound.

SUMMARY OF THE INVENTION

The recognizer is divided into three subparts, two of which analyze and recognize the spoken word and the third which monitors the operation of the other two. The first part, the feature extractor, analyzes the spoken word. The second part, the decision/display section receives the feature extractor output and processes it through a logic system programmed to decide which word has been spoken and displays the word. The third part, the control section, monitors the operation of the recognizer and generates the appropriate signals to control the operation of the recognizer and the display section.

The feature extractor receives the word sound signal and transforms it into a corresponding electrical signal. This electrical signal is first normalized with respect to amplitude and then frequency-divided by a number of bandpass filters. For the purpose of explanation, four frequency bandpass ranges are chosen, but it is to be understood that the number of bandpasses into which the voice spectrum will be divided may be greater.

Signals from the bandpass filters are rectified, producing a DC voltage level in each bandpass channel, the DC level being functionally related to the energy present in each bandpass frequency range. This signal is called the integrated output. The integrated output is passed through a differentiator which produces a signal approximating the slope-amplitude product of the integrated output and is called the differentiated signal. The integrated output represents the power spectrum density at any instant of time while the differentiated output represents the slope-amplitude product characteristic at any instant of time. The slope-intensity product is defined as the signal amplitude rate of change with respect to time multiplied by the signal amplitude or by a constant factor thereof.

A set of adjustable level detectors or thresholds are included in the feature extractor. Double threshold detectors are provided in each bandpass channel for each integrated output and for each differentiated output. The use of two threshold detectors makes possible detection at three discrete levels: above a maximum, a level between a maximum and minimum, and below a minimum level.

The feature detector includes a silence detector and an end of word detector. As spoken words have periods of silence within them, the silence detector is used to indicate these periods of silence. The end of word detector monitors the output of the silence detector and indicates when the silence has occurred within a word or when the silence corresponds to the end of a word.

The second section, the decision/display receives the output of the feature extractor and processes its signal through a logic system to decide which word is spoken. The decision logic is a programmable network with a display so that results of the decision can be subsequently stored and displayed.

The third section, the control section, directs the operation of the recognizer by monitoring the recognizer's operation and generating appropriate signals to direct subsequent recognizer operations. The control logic generates signals to update or store in the display, advances and resets the flip flops in the decision logic and generates the verification signals.

DESCRIPTION OF THE PREFERRED EMBODIMENT

The recognizer is explained by describing its operation in recognition of vocabulary words. By way of example, the numbers 0–9 inclusive are chosen. It should be noted however, that these 10 digits are shown by way of example only and it is to be understood that the invention is not limited to these particular numbers, but that any spoken word may be recognized by properly programming the recognizer.

As a first step in programming the system, the vocabulary is chosen. In this application the vocabulary chosen is the digits 0–9. Each of the digits has a set of specific features or a unique set of features for a particular digit. These features may include a high frequency sound followed by a period of silence followed by another high frequency sound as in the digit 6, a high frequency sound as at the beginning of 7, and a period of silence near the end of word 8 because of the stop consonant. Each of the digit's unique set of features are displayed in the time diagrams in FIGS. 1A to 1J corresponding to the digits 0–9 respectively.

Figure 1A:
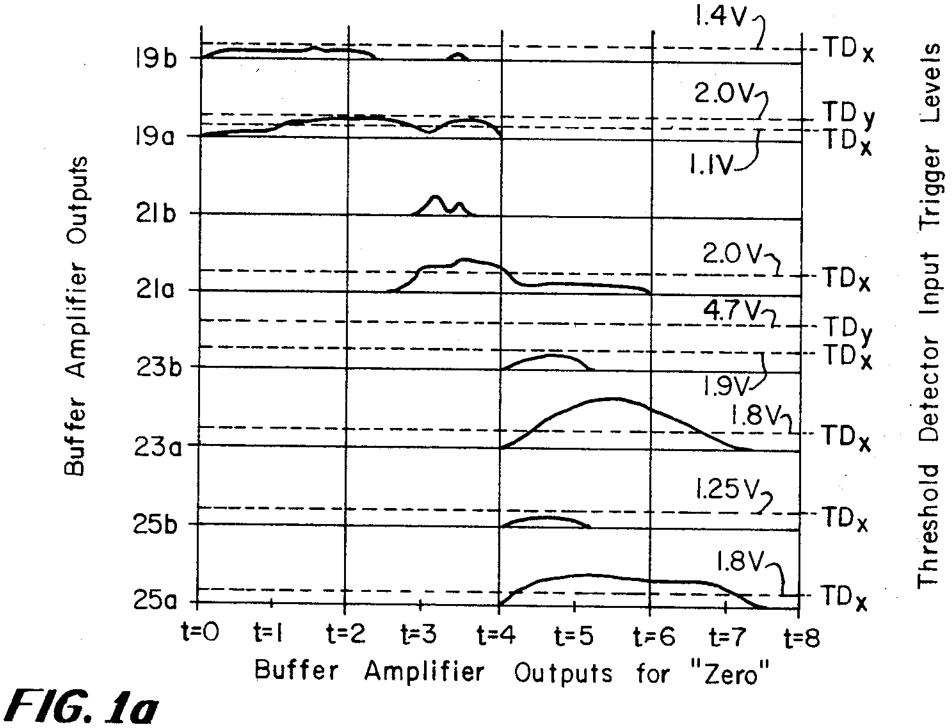
FIGS. 1A through 1J are time diagrams of the integrated and differentiated output signals directed to the threshold devices shown in FIG. 2.
Figure 1B:
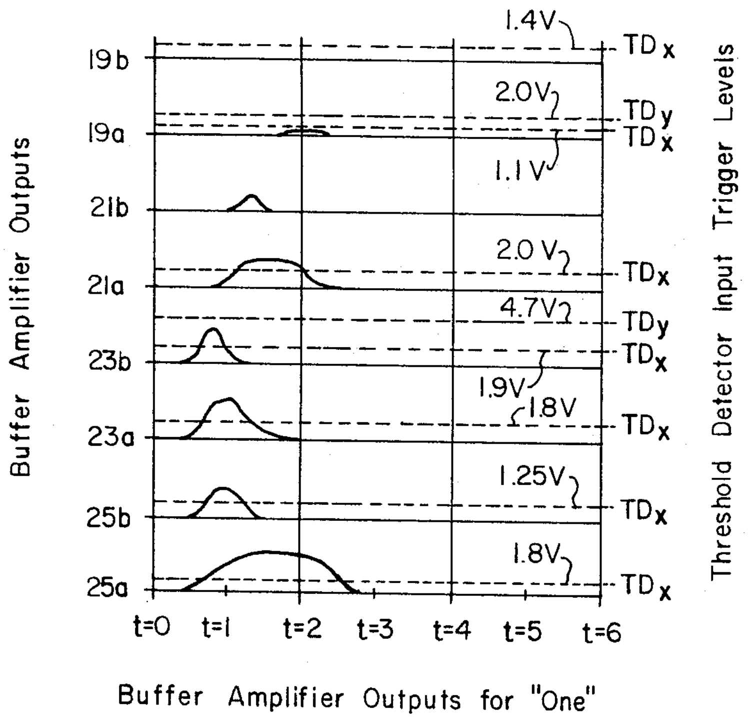
Figure 1C:
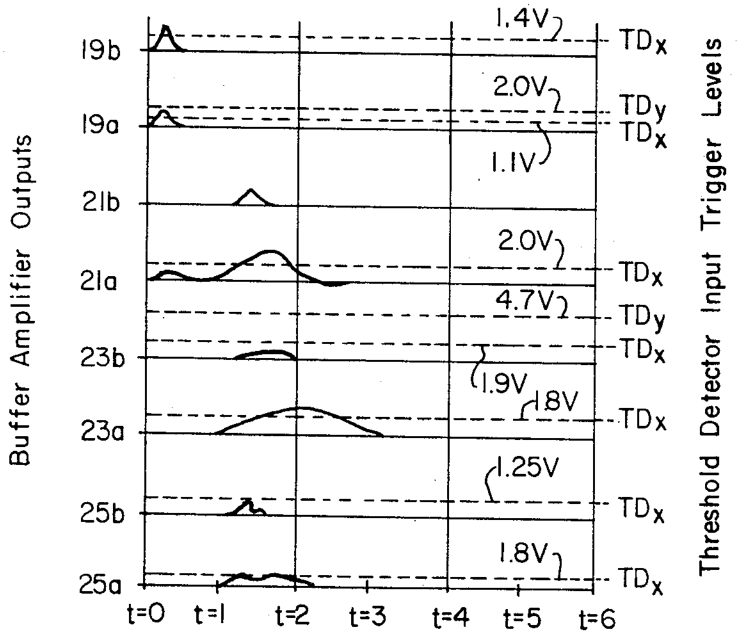
Figure 1D:
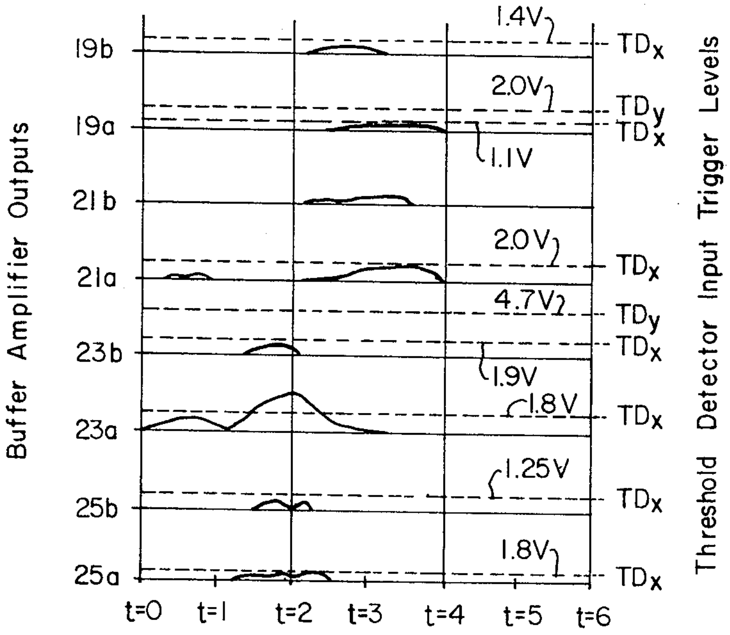
Figure 1E:
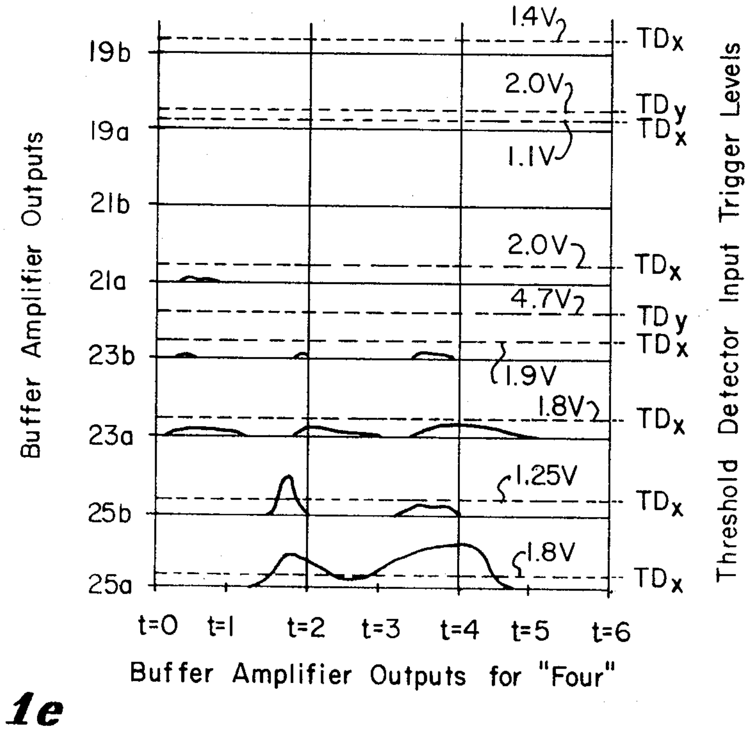
Figure 1F:
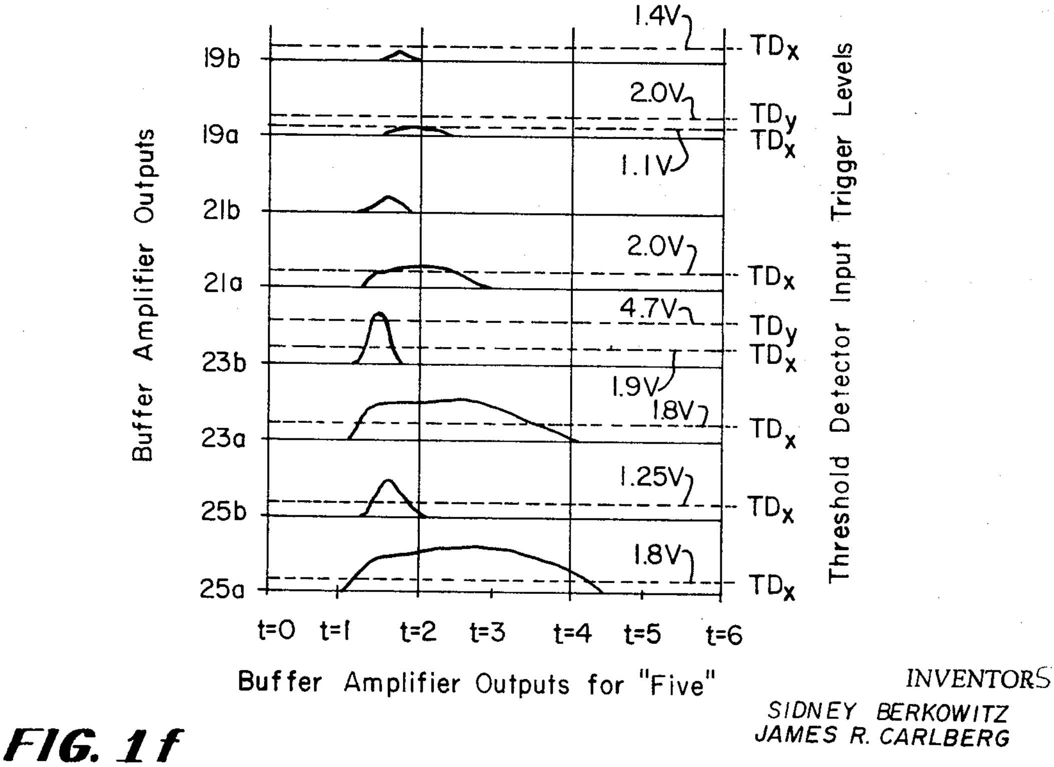
Figure 1G:
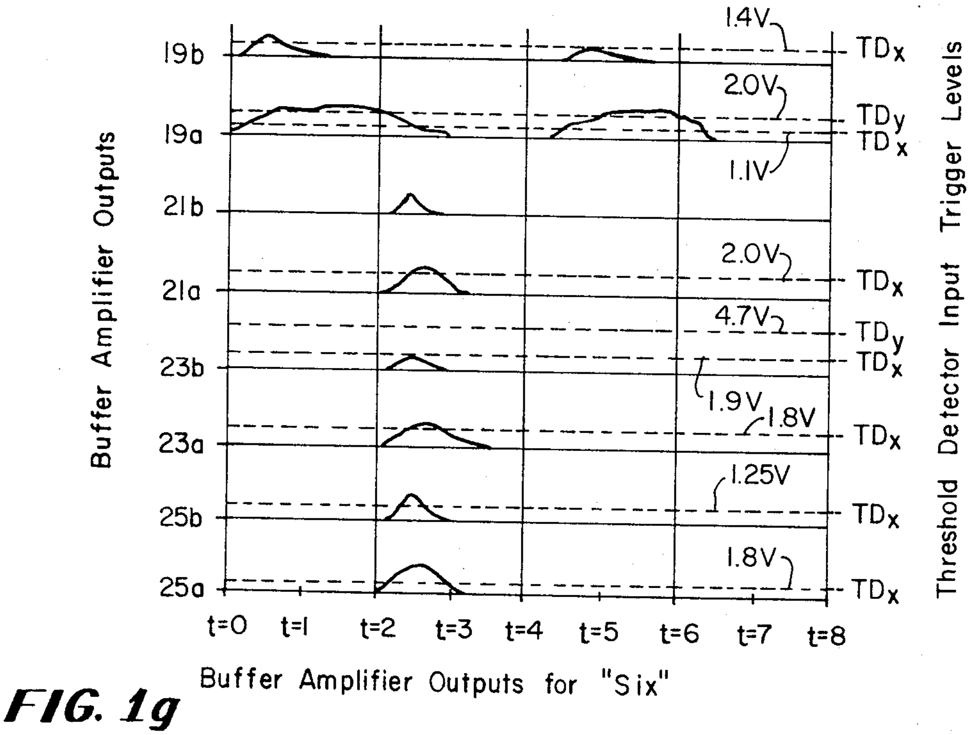
Figure 1H:
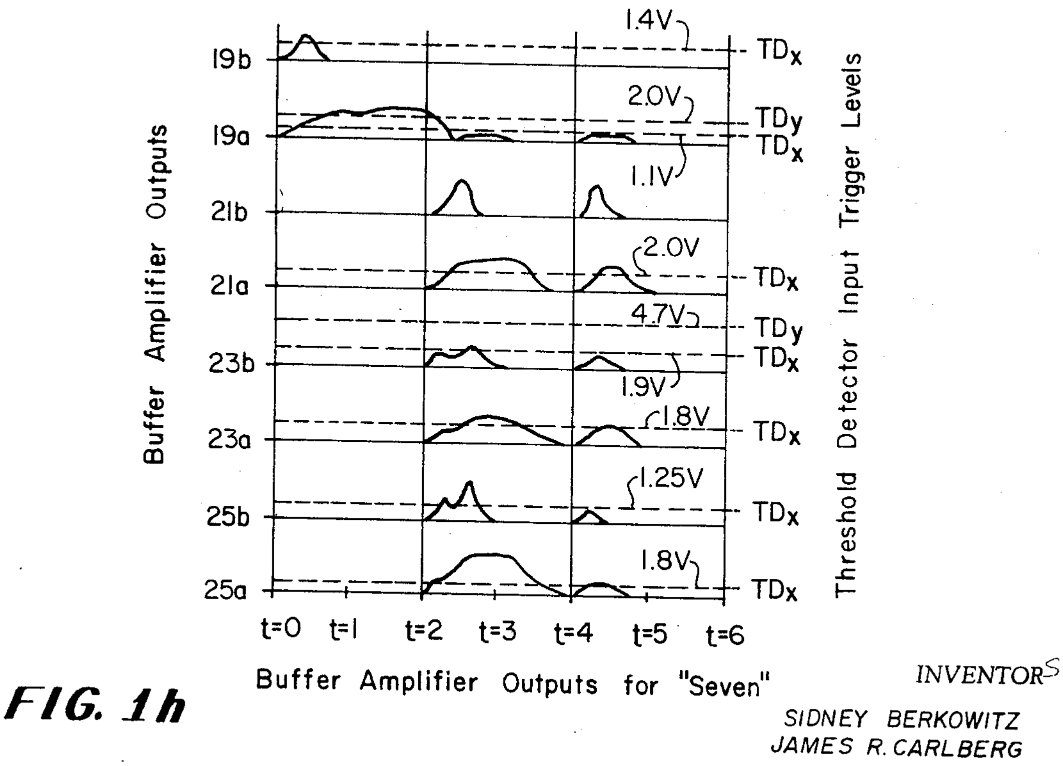
Figure 1I:
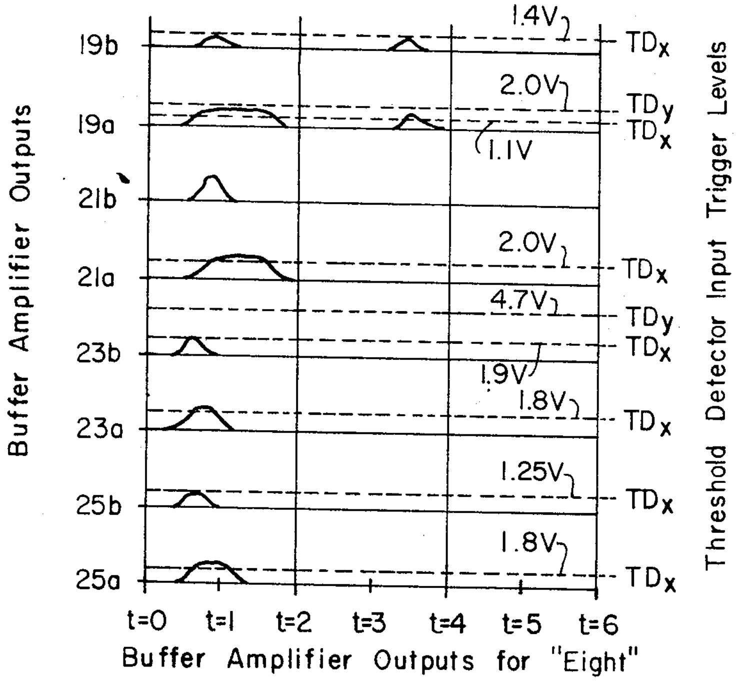
Figure 1J:
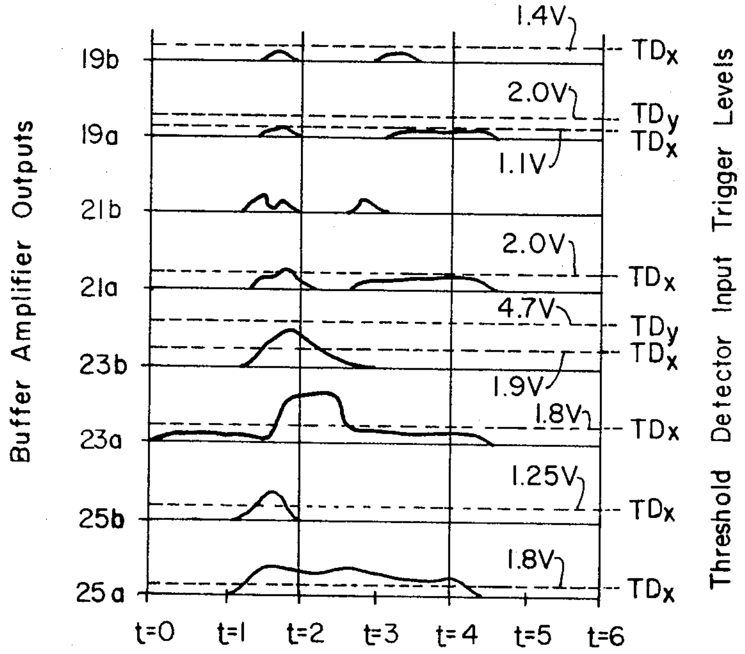
Figure 2:
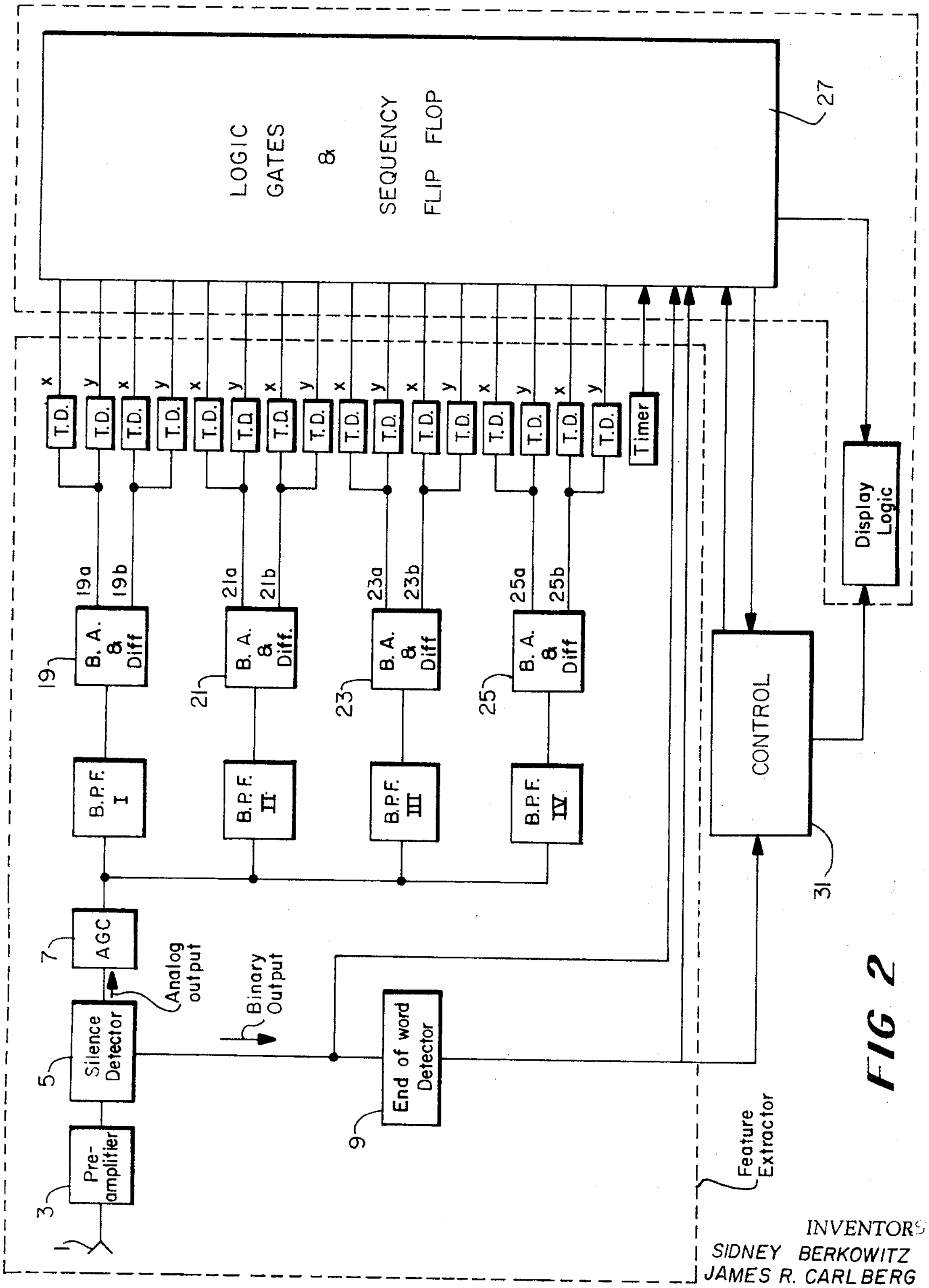
FIG. 2 is a block diagram of the first embodiment with the signals shown in 1A through 1J being the outputs of each buffer amplifier and differentiator shown in FIG. 2.

Referring to FIG. 2, the recognizer system is shown as having a microphone input 1 for transforming the sound energy into electrical energy which is then amplified by preamplifier 3. Silence detector 5, connected to preamplifier 3, has an analog signal output which is connected to automatic gain control (AGC) 7 and a digital output which is connected to end of word detector 9 and to logic system 27. The silence detector indicates the occurrence of a silence period before, after, and within a spoken word. When a silence is detected the analog signal is blanked out so as to eliminate the processing of any signal noise.

The binary output of the silence detector becomes logical 1 when the input signal exceeds the noise level and becomes logical 0 when the input signal is less than the noise level.

From the AGC 7 the signal is inputted into four preset bandpass filters which separate the signal into four frequency ranges, represented by bandpasses I, II, III, and IV. Each frequency range is rectified and smoothed by respective buffer amplifiers 19–25, each amplifier having two outputs (**19*a* and 19*b* for amplifier 19, 21*a* and 21*b* for amplifier 21, 23*a* and 23*b* for amplifier 23, and 25*a* and 25*b* for amplifier 25**). The "*a*" output of each buffer amplifier is the integrated output and the "*b*" output of each buffer amplifier is the differentiated output.

The integrated output is a DC voltage level functionally related to the energy present in each frequency range at each instance of time. The integrated output represents the short term power spectrum of the normalized signal output of the AGC 7 or the energy intensity over a respective bandpass at any instant of time. The integrated output is differentiated to produce a voltage at the "*b*" outputs of the buffer amplifier representing the slope-intensity product of the input signal.

Connected to each output of each of the amplifiers 19–25 are two threshold detectors TD*x* and TD*y*. The threshold levels are set according to a procedure described below. A bank of logic gates and flip flops 27 are connected to the outputs of each of the threshold detectors. Display 33 connected to control logic 31 and to the output of the logic gates and flip flops 27 display the digit spoken into microphone 1 and recognized by the system.

Referring to FIGS. **1*a*–1*j***, the response of the threshold detectors to a spoken word is now described.

As shown in FIGS. **1*a*–1*j***, each spoken word generates a unique set of integrated and differentiated voltage wave forms from the band pass filter bank. Recognition is initiated by setting the trigger levels of the threshold detectors to produce a unique combination of trigger signals for each word.

To recognize the spoken word zero, threshold TD*x* connected to output **19*a* is set at 1.1v, which is below the maximum expected voltage amplitude for this word while threshold TDy connected to output 19*a* is set at 2.0v, which is above the maximum voltage expected at output 19*a*** for this word. In this way a voltage level appearing between the trigger level of threshold detector *y* and the level of threshold detector *x* is recognized as a binary 0 from detector *y* and binary 1 from detector *x* and inputted to the decision/display section. Note that for the words six and seven, both threshold detectors *x* and *y* will have as an output a high or binary 1 signal for the indicated settings.

Similarly, the threshold levels are set for the detectors connected to each of the other outputs to produce a respective signal indicating recognition of a particular voltage level. The voltage levels in FIGS. **1*a* through 1*j* are chosen by examining the time diagrams (1*a*–1*j***) produced by speaking each of the digits into a microphone and displaying the signal visually. The threshold levels are then placed so that the voltage levels out of each amplifier's output in response to a word spoken into the microphone will produce a unique set or combination of threshold level signals from the bank of threshold detectors and into the decision/display section.

Generally stated, the threshold detector levels are established so that each of the spoken digits 0–9 will yield a unique combination of threshold outputs which will not be duplicated when any of the other vocabulary digits are spoken into the system. For this purpose, each of the threshold detector levels must be set up relative to the voltage amplitude time diagrams of each one of the bandpass buffer amplifier outputs, FIGS. **1*a*–1*j***.

The voltage levels shown are suitable for distinguishing between each of the digits 0–9. It is to be understood however that other words may be added to the vocabulary and may be distinguished in the same manner by setting the threshold detectors and the bandpass ranges to produce a unique combination of threshold signals for each word spoken, and by restructuring the logic system 27. For each new vocabulary then, the logic system will need to be restructured.

The levels of detectors TDx and TDy connected to each of the buffer amplifier outputs may be adjusted by trial and error until the maximum number of unique combinations of threshold detectors outputs will be obtained for the vocabulary set.

The threshold detectors responses to each of the spoken words, corresponding to the trigger levels shown in FIGS. **1*a*–1*j* are shown in the Table I. E is the digital silence detector signal indicating a silence occurring within a word. Blanks in Table I represent logical 0** outputs meaning the threshold detector input does not exceed the trigger level for the spoken digit and S represents a marginal threshold trigger occurrence which means that the input trigger level may sometimes be exceeded. The *x*'s represent trigger threshold detector output logical 1 signals when the corresponding vocabulary digit is spoken into the system.

As shown in FIG. **1*a* when the threshold detector levels are properly established the spoken digit 0** will cause an output from threshold detector *x* connected to output **23*a***, from threshold detector *x* connected to output **21*a*** and from threshold detector *x* connected to output **19*a*. Similarly, when the digit 6** is spoken into the system, threshold detector *x* at output **25*b*** will generate a signal as will threshold detector *x* at output **23*a***, threshold detector *x* at output **21*a***, threshold detector *x* at output **19*a***, threshold detector *y* at output **19*a***, threshold detector *x* at output **19*b* and the silence detector 5** would generate a signal for the silence within the word.

Referring now to FIGS. **3*a*–3*k*** the logic circuits for identifying the unique combinations of threshold outputs will now be discussed with respect to each word in the vocabulary.

Referring now to FIG. **3*a* and Truth Table 1**, the

TABLE I

| Threshold detectors | Digits spoken 0 | 1 | 2 | 3 | 4 | 5 | 6 | 7 | 8 | 9 |
|---|---|---|---|---|---|---|---|---|---|---|
| 25b/TDx | | X | S | | X | X | X | X | S | X |
| 23a/TDx | X | X | X | X | | X | X | X | X | X |
| 23b/TDx | | X | | | | X | S | X | S | X |
| 23b/TDy | | | | | | X | | | | |
| 21a/TDx | X | X | X | | | X | X | X | X | X |
| 19a/TDx | X | | X | | | S | X | X | X | |
| 19a/TDy | | | | | | | X | X | | |
| 19b/TDx | | | X | | | | X | X | | |
| E[1] | | | | | | | X | | X | |

NOTE.—X=triggers threshold detector; S=sometimes triggers threshold detector.

logic network system for recognizing two or one periods of silence within a word and for generating a digit "1" corresponding to that silence is shown. The logical network is shown as having five (Reset-Set Flip Flops) RSFF's and four "nor" gates. The control section 31, resets all the RSFF's to state Q=0 and $\overline{Q}$=1. When a word is spoken into the system (line A of Truth Table 1) the digital output from silence detector 5 assumes a state of digital "1." This signal fed into RSFF 1 changes its state to an output of Q=1 and $\overline{Q}$=0. The input to nor gate number 1 is then (1,0) causing its output to be 0. RSFF 2, having a zero input to its S terminal, is unchanged and its output is $\overline{Q}$=1. The input to nor gate 2 being 0,1 has an output 0. The zero output applied to RSFF 3 leaves its state unchanged at $\overline{Q}$=1 and the output of nor gate 3 is then zero to the S terminal of RSFF 4. With a zero input to the S terminal the output from RSFF 4 is Q=0 and $\overline{Q}$=1. The output of nor gate 4 is then zero for the input (1,0). With 0 applied to terminal S of the RSFF, the Q output of RSFF 5 is zero. When a silence is detected and the input signals fall below the noise level, the state of the silence detector 5 changes from digit 1 to digit 0. The digit 0 input to RSFF 1 (line B of Truth Table 1) leaves its state unchanged at $\overline{Q}$=0. However, nor gate 1 now has an input of (0,0) changing its output to 1. This changes the state of RSFF 2 to Q=1 and $\overline{Q}$=0. The output of nor gate 2, having a (1,0) input is zero to the S terminal of the RSFF 3. RSFF 3 is unchanged with Q=0=E. The input to nor gate 3 being (0,1) gate 3 has a zero output. RSFF 4, having an S terminal input of zero from nor gate 3 has the state Q=0 and $\overline{Q}$=1. Nor gate 4 then with an input zero has an output 0 and the output state of RSFF 5 is unchanged.

When the silence period is terminated and the signal rises above the noise level (line C) the output from the silence detector is changed to a digit 1 keeping the state of RSFF 1 at Q=1 and $\overline{Q}$=0. Nor gate 1 having a (1,0) input now has an output of zero leaving the state of RSFF 2 unchanged at Q=1 and $\overline{Q}$=0. Nor gate 2 having a (0,0) input has an output state of 1 to the S terminal of RSFF 3 which causes its state to change from states Q=0=E1 and $\overline{Q}$=1 to states Q=1=E1 and $\overline{Q}$=0. The output signal E1 from the Q terminal of the RSFF 3 now assumes a digit 1 state signaling that a silence within a word has occurred. If a second silence is heard through the same word the states of the RSFF's will change responsively causing a second silence signal E to be generated as shown in lines D and E of Table 1.

Referring now to FIG. **3*b* and Truth Table 2**, the timing logic subsystem sequence is shown. Timing circuits are used when the combinations of threshold triggers generated by two distinct words in a vocabulary are too similar to be distinguished simply by the arrangement of the threshold levels. In this case it is necessary to distinguish the time sequence between the occurrence of the trigger gate signals to distinguish between vocabulary words.

When a vocabulary word is recognized and before a new word is spoken into the system the control logic generates a reset pulse to reset terminals of all the RSFF's, resetting their states to Q=0 and $\overline{Q}$=1. A threshold signal A representing digital 1 from one of the threshold gates connected to the timer, causes timer RSFF 1 to change to state Q=1 and $\overline{Q}$=0. The negative going pulse from the $\overline{Q}$ output of RSFF 1 triggers the multivibrator causing it to generate a pulse of a specific time duration. The digital 1 signal from the multivibrator is inverted to a digital 0 which is then inputted to nor gate 1. The threshold signal A is also connected in parallel to another terminal of nor gate 1. The (0,1) input to nor gate 1 produces a 0 output to RSFF 2 leaving its state unchanged and the input of nor 2 at (0,1). The output of nor 2 would then be zero to the S terminal of RSFF3 leaving its output at terminal Q=0 and $\overline{Q}$=1.

In the case that the threshold signal A changes from digital 1 to digital 0 prior to the expiration of the timing pulse from the multivibrator an output signal will be generated at $T_2$ as follows.

The zero signal to RSFF 1 caused by a termination of threshold signal A leaves its state unchanged at Q=1 and $\overline{Q}$=0. As the multivibrator has been initiated by a negative going pulse from terminal $\overline{Q}$ of RSFF 1 it will run until the termination of designated pulse period and its output state will be 1. The output of the inverter will then be 0 and the input to nor gate 1 will be (0,0) causing its output to be 1. The 1 output from nor gate 1 to the S terminal of RSFF 2 will change its state from state Q=0 and $\overline{Q}$=1 to state Q=1 and $\overline{Q}$=0. The output of nor gate 2 will be 0 corresponding to an input of (1,0). The 0 input to the set gate of RSFF 3 will then leave RSFF 3 output unchanged at Q=0 and $\overline{Q}$=1. When the end of the timing signal is reached, and under the conditions that the timing signal duration exceeds the duration of the signal from threshold A, a timing signal will be generated at $T_2$. As shown in line C, the threshold signal A is now "0". The state of RSFF 1 is unchanged at Q=1 and $\overline{Q}$=0. The output from the multivibrator now is 0 and the inverter output is 1 leaving the input to nor gate 1 at (1,0) and its output 0. The state of RSFF 2 is maintained at Q=1 and $\overline{Q}$=0, the input to nor gate 2 is (0,0) and its output is 1. The 1 digit signal to the S terminal of RSFF 3 causes its state to change from Q=0 and $\overline{Q}$=1 to Q=1 and $\overline{Q}$=0. The $T_2$ signal connected to the Q terminal of RSFF 3 then assumes a digital 1 signifying that the multivibrator pulse has exceeded the pulse of the threshold signal from gate A. Although not shown in the Truth Table 2, if the pulse of the threshold signal A exceeds the pulse of the multivibrator no signal will be generated from output terminal Q of RSFF 3 signifying that the pulse of threshold signal A exceeded the pulse width of the multivibrator.

Referring now to FIGS. **3*c*–3*k*** and Truth Tables 3–11, the logic systems for processing the threshold de-

TRUTH TABLE 1

| | Input | RSFF 1 | Nor 1 | RSFF 2 | Nor 2 | RSFF 3 | Nor 3 | RSFF 4 | Nor 4 | RSFF 5 |
|---|---|---|---|---|---|---|---|---|---|---|
| A | 1 | Q=1, $\overline{Q}$=0 | 0 | Q=0, $\overline{Q}$=1 | 0 | Q=0=$E_1$, $\overline{Q}$=1 | 0 | Q=0=$E_1$, $\overline{Q}$=1 | 0 | Q=0=$E_2$, $\overline{Q}$=1 |
| B | 0 | Q=1, $\overline{Q}$=0 | 1 | Q=1, $\overline{Q}$=0 | 0 | Q=0=$E_1$, $\overline{Q}$=1 | 0 | Q=0, $\overline{Q}$=1 | 0 | Q=0=$E_2$, $\overline{Q}$=1 |
| C | 1 | Q=1, $\overline{Q}$=0 | 0 | Q=1, $\overline{Q}$=0 | 1 | Q=1=$E_1$, $\overline{Q}$=0 | 0 | Q=0, $\overline{Q}$=1 | 0 | Q=0=$E_2$, $\overline{Q}$=1 |
| D | 0 | Q=1, $\overline{Q}$=0 | 1 | Q=1, $\overline{Q}$=0 | 0 | Q=1=$E_1$, $\overline{Q}$=0 | 1 | Q=1, $\overline{Q}$=0 | 0 | Q=0=$E_2$, $\overline{Q}$=1 |
| E | 1 | Q=1, $\overline{Q}$=0 | 0 | Q=1, $\overline{Q}$=0 | 1 | Q=1=$E_1$, $\overline{Q}$=0 | 0 | Q=1, $\overline{Q}$=0 | 1 | Q=1=$E_2$, $\overline{Q}$=1 |

TRUTH TABLE 2

| | Threshold Signal A | RSFF 1 | Multivibrator | Inverter | Nor 1 | RSFF 2 | Nor 2 | RSFF 3 |
|---|---|---|---|---|---|---|---|---|
| A | "1" | $Q=1$, $\overline{Q}=0$ | 1 | "0" | 0 | $Q=0$, $\overline{Q}=1$ | 0 | $Q=0=T_2$, $\overline{Q}=1$ |
| B | "0" | $Q=1$, $\overline{Q}=0$ | 1 | "0" | 1 | $Q=1$, $\overline{Q}=0$ | 0 | $Q=0$, $\overline{Q}=1$ |
| C | "0" | $Q=1$, $\overline{Q}=0$ | 0 | "0" | 0 | $Q=1$, $\overline{Q}=0$ | 1 | $Q=1=T_2$, $\overline{Q}=0$ |

TRUTH TABLE 3

| Digit spoken | Output | 19a/TDx | $\overline{19b/TDy}$ | $\overline{23b/TDx}$ | $\overline{E}_1$ |
|---|---|---|---|---|---|
| Zero | 1 | 1 | 1 | 1 | 1 |

TRUTH TABLE 4

| Digit spoken | Output And 2 | Output And 3 | $\overline{19a/TDx}$ | 23b/TDx | $\overline{23b/TDy}$ | $T_2$ |
|---|---|---|---|---|---|---|
| One | 1 | 0 | 1 | 1 | 1 | 1 |
| Nine | 0 | 1 | 1 | 1 | 1 | 0 |

TRUTH TABLE 5

| Digit spoken | Output | $\overline{19a/TDy}$ | 19b/TDx |
|---|---|---|---|
| Two | 1 | 1 | 1 |

TRUTH TABLE 6

| Digit spoken | Output | $\overline{21a/TDx}$ | 23a/TDx |
|---|---|---|---|
| Three | 1 | 1 | 1 |

TRUTH TABLE 7

| Digit spoken | Output | $\overline{23a/TDx}$ | 25b/TDx |
|---|---|---|---|
| Four | 1 | 1 | 1 |

TRUTH TABLE 8

| Digit spoken | Output | 23b/TDy |
|---|---|---|
| Five | 1 | 1 |

TRUTH TABLE 9

| Digit spoken | Output | 19a/TDy | E |
|---|---|---|---|
| Six | 1 | 1 | 1 |

TRUTH TABLE 10

| Digit spoken | Output | 19a/TDy | $\overline{E}_1$ |
|---|---|---|---|
| Seven | 1 | 1 | 1 |

TRUTH TABLE 11

| Digit spoken | Output | 19a/TDx | $\overline{19a/TDy}$ | E1 |
|---|---|---|---|---|
| Eight | 1 | 1 | 1 | 1 |

tector outputs and identifying the words corresponding to each combination of outputs are shown.

The Boolean Equations representing the decision logic is as given in Table II below.

TABLE II

| Digit | |
|---|---|
| 0 | $19a/TDx \cdot \overline{19a/TDy} \cdot \overline{23b/TDx} \cdot \overline{E}_1$ |
| 1 | $\overline{19a/TDx} \cdot 23b/TDx \cdot \overline{23b/TDy} \cdot T_2$ |
| 2 | $\overline{19a/TDy} \cdot 19b/TDx$ |
| 3 | $\overline{21a/TDx} \cdot 23a/TDx$ |
| 4 | $\overline{23a/TDx} \cdot 25b/TDx$ |
| 5 | $23b/TDy$ |
| 6 | $19a/TDy \cdot E_1$ |
| 7 | $19a/TDy \cdot \overline{E}_1$ |
| 8 | $19a/TDx \cdot \overline{19a/TDy} \cdot E_1$ |
| 9 | $\overline{19a/TDx} \cdot 23b/TDx \cdot \overline{23b/TDy} \cdot \overline{T}_2$ |

wherein each designation (i.e., 19*a*/TD*x*, 23*b*/TD*y*) signifies a digital "1" output from the designated threshold device and each designation including a bar notation (i.e., $\overline{19a/TDx}$, $\overline{23b/TDx}$) signifies a digital "0" from the designated threshold device.

Figure 3A:
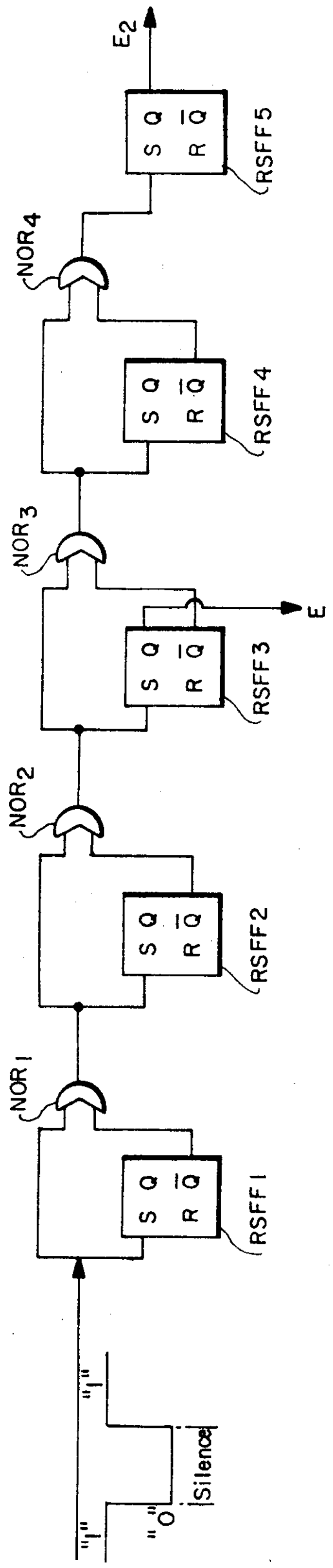
FIGS. 3A through 3K form the logic systems connected to the threshold detectors shown in FIG. 2, identifying the particular words spoken.
Figure 3B:
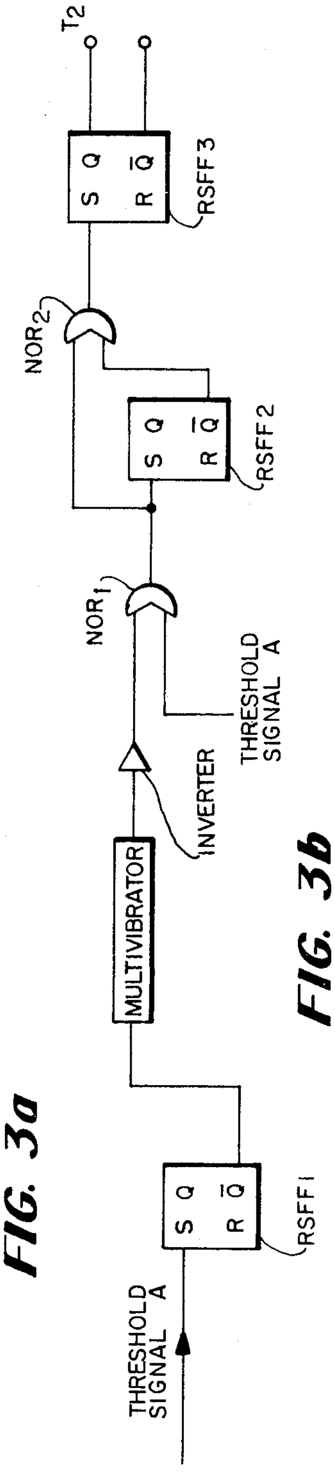
Figure 3C:
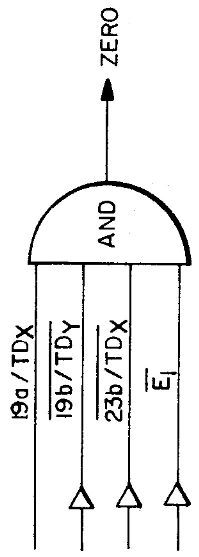

In FIG. 3*c* the logic subsystem for recognizing the word zero is shown as including an "and" gate with inputs connected to threshold detector 19*a*/TD*x*, 19*b*/TD*y* through an inverter, 23*b*/TD*x* through an inverter and to a silence detector logic subsystem (FIG. 3a) output E1 through an inverter. The effect of the inverters is to change a logic "1" to a logic "0" and to change a logic "0" to a logic "1." The word zero is recognized when a trigger signal is received from threshold 19*a*/TD*x* and when no trigger signals are produced by 19*b*/TD*y*, 23*b*/TD*x* and the silence detector logic system.

Figure 3D:
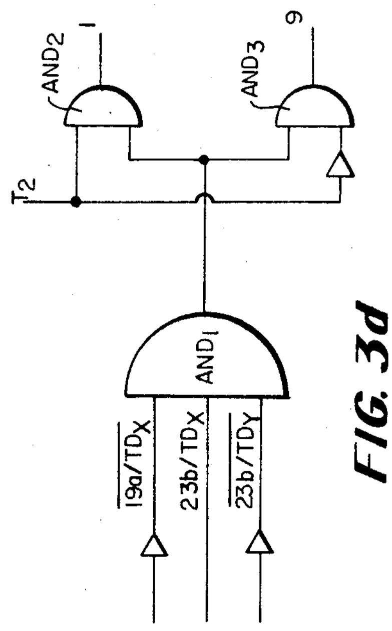

In FIG. 3*d* and Truth table 4 the logical system for recognizing the digits nine and one are shown as having an "and" gate connected to 19*a*/TD*x* and 23*b*/TD*y* through inverters and to 23*b*/TD*x*. When a digital 1 signal is produced by 23*b*/TD*x* and digital 0 is produced by 19*a*/TD*x* and 23*b*/TD*y*, the "and" gate is triggered to produce digital one.

As the set of threshold signals produced when one and nine are spoken into the system is too similar to permit discrimination between the spoken word one and nine purely on the responses of the threshold gates, a timing signal is used to distinguish between the two words. As shown in FIG. 3*b*, a timing signal is produced if the threshold signal from a gate is removed before the expiration of the pulse signal from the multivibrator. In this case the threshold signal used is the signal from 23*a*/TD*x*, if the 23*a*/TD*x* expires before the multivibrator signal expires then the word spoken is one. If the threshold signal is "on" longer than the multivibrator pulse then the word spoken into the system is nine. As shown in FIG. 3*d* the signal $T_2$ is from the timing network (FIG. 3*b*) with its respective RSFF 1 and nor 1 inputs connected to threshold 23*b*/TD*x*.

As shown in Truth Table 4, corresponding to the logic system of FIG. 3*d* an output of digital one from "and 2" signifies the word one spoken into the system. An output of 1 from "and 3" signifies the word nine is spoken into the system.

Figure 3E:
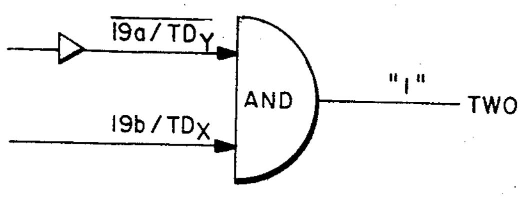

Referring now to FIG. 3*e*, the logic system for identifying the word two is shown as including an "and" gate having an input connected to the threshold device 19*a*/TD*y* through an inverter and to threshold device 19*b*/TD*x*. As shown an output "1" from the "and" gate is produced when a threshold trigger signal is received from threshold device 19*b*/TD*x* in combination with threshold signal produced from 19*a*/TD*x* transformed by the inverter.

Figure 3F:
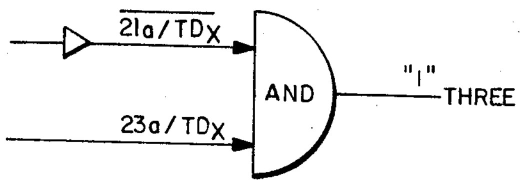
Figure 3G:
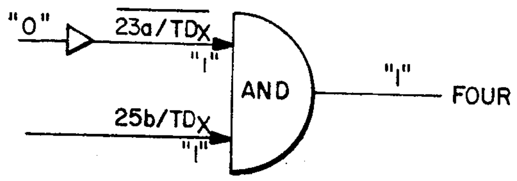

As shown in FIG. 3*f* the combination of signals into the "and" gate to produce the logic one corresponding to the word three spoken into the system is the digit "1" signal from threshold device 23a/TD$x$ and the digit "0" signal from threshold device 21a/TD$x$ to the inverter which transforms the "0" 21a/TD$x$ signal into a "1" digit signal and combines with the 23a/TD$x$ signal to produce a "1" output correspondiging to the word three spoken into the system.

Similarly, the word four is identified by a logic 1 appearing at the output of 25b/TD$x$ and a logic "0" at threshold device 23a/TD$x$ connected to the "and" gate through an inverter. A digital one produced by threshold device 25b/TD$x$ and digital zero produced by 23a/TD$x$ combines with the input to the "and" gate to produce a digital one corresponding to the word four spoken into the system as shown in Table 7.

Figure 3H:
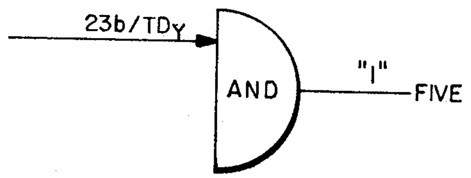

Referring now to FIG. 3h and Table 8, the word five spoken into the system is identified by a single trigger output from gate 23b/TD$y$.

Figure 3I:
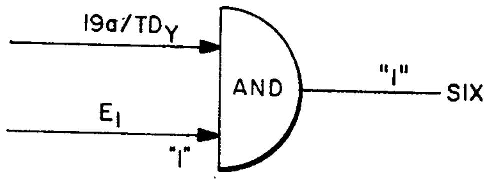

As shown in FIG. 3i, a one digit at the output of the "and" gate corresponding to the word six spoken into the system is produced by a digital "1" signal from threshold 19a/TD$y$ and from a digital "1" signal produced by the silence detector (FIG. circuit. a) CIRCUIT. The combination of the digital "1" at the input of the "and" gate proeduced by a signal from threshold device 19a/TD$y$ and the digital "1" from the silence detector circuit produce a digital "1" at the output of the "and" gate corresponding to the word six spoken into the system and as shown in Truth Table 9.

Figure 3J:
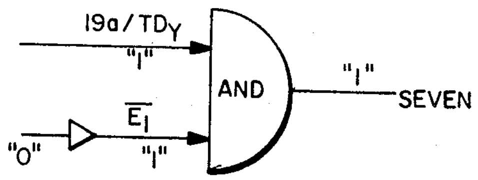

Referring now to FIG. 3j, the logic system for identifying the word seven spoken into the system is shown as having an "and" gate with its inputs connected to threshold device 19a/TD$y$ and to the silence detector through an inverter. A threshold trigger from detector 19a/TD$y$ produces a digital "1" signal at the "and" gate which combines with the "1" input from the inverter in the absence of a silence signal from sound detector 5, producing a "1" output at the "and" gate output.

Figure 3K:
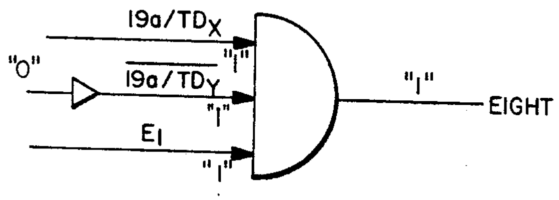

Referring now to FIG. 3k, the logic system for identifying the word eight is shown as having an "and" gate with its inputs connected to threshold detector 19a/TD$x$, to 19a/TD$y$ through an inverter and to the silence detector of logic circuitry terminal $E_1$. The "and" gate produces a "1" digit output corresponding to the word eight when a digital "1" signal is received from the threshold detector output 19a/TD$x$, a digital "0" signal from threshold detector output 19a/TD$y$, and when a digital "1" signal is produced by the silence detector logic output terminal $E_1$.

These examples of recognition logic for processing the output threshold signals, the timing signals, and the silence signals to produce recognition signals corresponding to the words spoken into the system are shown by way of examples only and it is to be understood that the device is not limited to the specific examples shown but may be expanded or changed to recognize any word within the scope of this invention.

The first embodiment shows the input signal inputted to a number of bandpass filters connected in parallel with the output of each bandpass filter processed through an amplifier to produce an integrated signal corresponding to the power spectrum density within the respective bandpass. This power density signal is then differentiated to produce slope-amplitude product signals for the respective bandpasses and these two signals (the integrated and differentiated signals) are used to trigger threshold detectors with the result that the unique set of threshold signals are generated for each word spoken into the system. An alternative to this system is shown in FIG. 4 wherein the system shown in FIG. 2 is partially shown.

Figure 4:
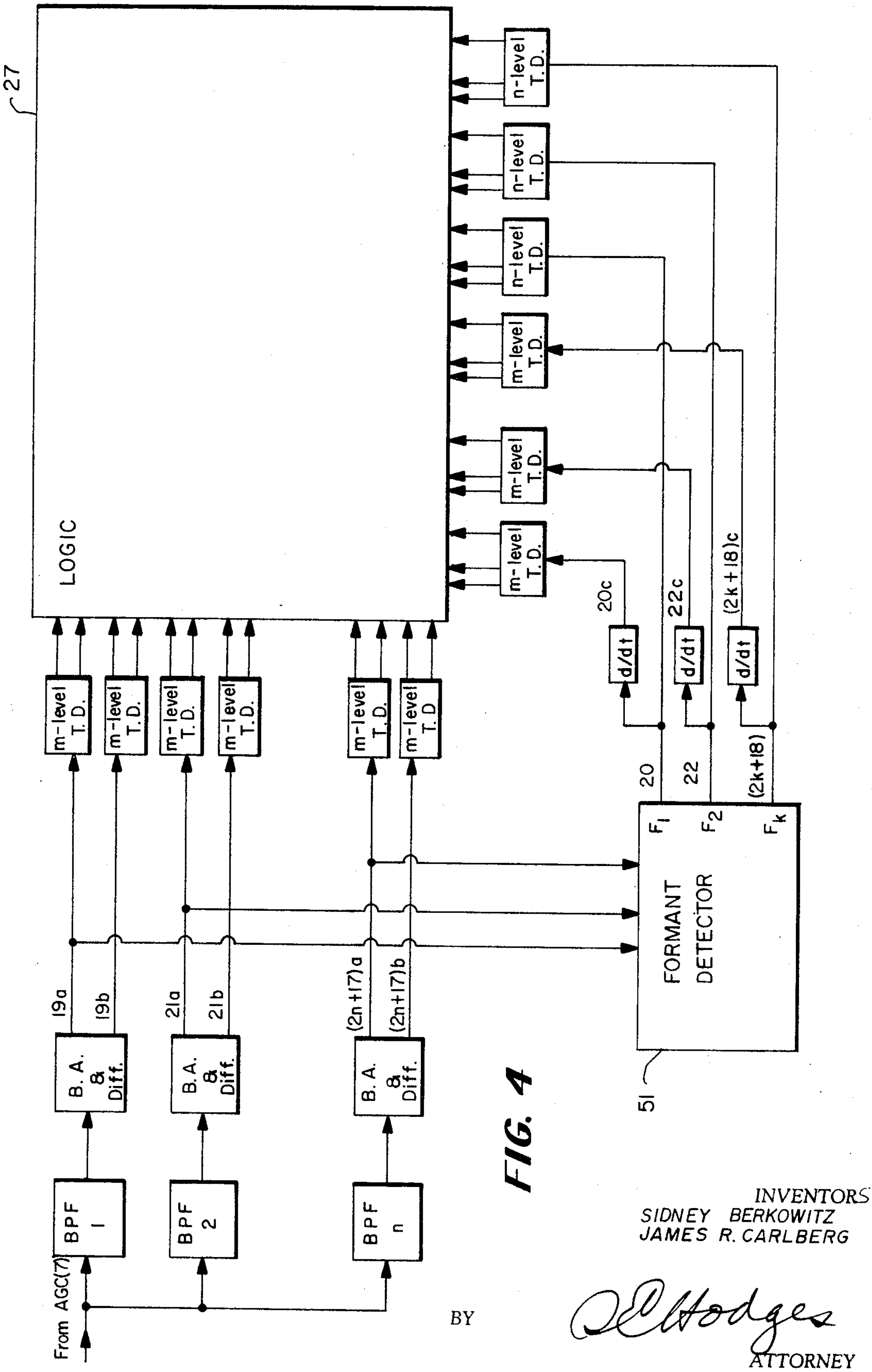
FIG. 4 is an alternative to the first embodiment of FIG. 2 and is shown as a partial system, it being understood, although not shown, that the input portion of the system including the microphone 1, preamplifier 3, silence detector 5, AGC 7, end of word detector 9, control section 31, and display logic are included connected to the same numbered elements as shown in FIG. 2.

In FIG. 4, the integrated outputs corresponding to the power spectrum density and the differentiated outputs corresponding to the slope-intensity product are as shown in FIG. 2. The threshold detectors are connected to respective integrated outputs 19a, 21a, . . . $(2n + 17)a$ and respective differentiated outputs 19b, 21b, . . . $(2n + 17)b$ which are triggered at signals bove preset levels as in the first embodiment.

The differences between the device of FIG. 4 and the device of FIG. 2 is the number of bandpass filters is extended beyond the four shown in FIG. 2 to include a number which may be, for example, 25, and the number of threshold detectors at each output of the buffer amplifiers has been extended beyond 2 to extend the amplitude level detecting capability of the device. The integrated output from each respective buffer amplifier is connected to a respective input of the formant detector 51. Each output of the formant detector 51 (20, 22, . . . [2K + 18]) is connected to a respective set of threshold detectors. These threshold detectors are used to indicate the frequency range for the corresponding formant.

A formant is generally defined as a time varying frequency range of high intensity peaks in a power spectrum, representative of vocal track resonances. Each formant detector output is additionally connected to a differentiator. The outputs of the differentiators (20c, 22c, . . . [2K + 18]$c$) are connected to a set of M level threshold detectors. These threshold detectors indicate the rate of formant shift in frequency. These threshold signals generated from the formant detector are used in conjunction with the threshold signals from the integrated and slope-intensity threshold gates to produce a unique set of signals for each word spoken into the system. A formant detector which may be used for this device is well known in the art and for example, may be the type shown in "Speech Analysis, Synthesis and Perception" by James L. Flannigan, Academic Press, Inc. New York, 1965, pg. 143–144.

The threshold detectors connected to each output of the formant detector are adjusted for $n$ input trigger levels where each of the $n$ levels will correspond to the center frequencies of each of the bandpass filters. Thus, the threshold detectors provide an indication of the frequency range of each formant. The M-level trigger levels of the threshold detectors connected to the differentiated formant outputs are then adjusted in the same manner described for the threshold detectors of the first embodiment to produce unique sets of threshold signals for each vocabulary word. The logic systems are programmed as in the first embodiment to produce unique signals for each vocabulary word. The logic systems are programmed as in the first embodiment to produce a signal indicating the vocabulary word spoken in response to the unique combinations of signals produced in response to each spoken vocabulary word by the threshold devices connected to the buffer amplifier outputs and the threshold devices connected to the formant detector outputs.

What is claimed is:

1. A programmable feature extractor and speech recognizer, comprising:

a first means for generating a first electrical signal in response to a spoken word;

a second means connected to said first means for generating an integrated signal indicative of the power spectrum density of said first signal and for generating time differentiated signal indicative of the slope-amplitude product characteristic of said first signal;

third means connected to said second means and responsive to said integrated signal and said differentiated signal for indicating the word spoken into said first means.

2. The system of claim 1 wherein said second means includes:

a plurality of bandpass filters for dividing said first signal into predetermined frequency ranges; and said second means includes means connected to the respective outputs of each of said pluralities of bandpass filters for generating said integrated and differentiated signals, in response to said respective bandpass filter output signals.

3. A system of claim 2 wherein; said second means includes:

a silence detector connected to said first means for generating a digital "1" when said signal from said first means exceeds a predetermined level and for generating a digital "0" when said signal from said first means is below said predetermined level;

said second means including a first and second plurality of threshold detectors; each of said first plurality of threshold detectors connected to a respective integrated signal output and each of said second plurality of threshold detectors connected to a respective differentiated signal output;

said threshold detectors being set at predetermined levels for generating signals when said integrated and differentiated output amplitudes exceed said predetermined levels.

4. The system of claim 3 wherein said third means include a plurality of logic systems, each of said logic systems being connected to said threshold detectors, and to the output of said silence detector according to a predetermined relationship;

said logic systems being responsive to said signals generated by said threshold detectors, and said silence detector for generating a signal indicating the word spoken into said first means.

5. The system of claim 4 wherein the output signals from the logic systems are connected to a dipslay system for indicating the word spoken into said first means;

said system including an end of word detector having an input connected to the digital output of said silence detector for indicating a silence corresponding to the end of a word;

said system including a control system responsive to the signal output of said end of word detector and the signals generated by said third means for monitoring the operation of the system and generating the appropriate signals to clear and control the operation of said third means and said display means.

6. The system of claim 4 wherein:

said second means includes a timing logic system connected to a predetermined threshold device for generating a timing signal in response to a predetermined time interval between the appearance of predetermined threshold signals;

said third means being responsive to said timing signal for identifying a word spoken into said first means.

7. A system of claim 2 wherein:

said second means includes means connected to the integrated signal output of each bandpass filter for generating a first signal indicative of frequency range of each formant and a second signal indicative of the rate of formant shift in frequency.

8. The system of claim 7 wherein:

said means for generating said first and second signals includes a formant detector having a plurality of inputs, each input connected to a respective said integrand output;

said formant detector having a plurality of outputs connected to said third means.

9. The system of claim 8 wherein:

said means for generating said second signal includes a plurality of differentiators;

each said differentiator input connected to a respective output of said formant detector;

a third plurality of threshold detectors;

each of said third plurality threshold detectors being connected to the output of a respective differentiator;

a fourth plurality of threshold detectors;

each of said fourth plurality of threshold detectors being connected directly to a respective output of said formant detector;

said threshold detectors being set at predetermined levels for generating signals when said formant differentiator and formant detector signals exceed said predetermined levels.

10. The system of claim 9 wherein:

said second means includes a silence detector connected to said first means for generating a digital "1" when said signal from said first means exceeds a predetermined level and for generating a digital "0" when said first means is below said predetermined level;

said third means includes a pluraity of logic trains;

each of said logic systems being connected to said threshold detectors, and to the output of said silence detector according to a predetermined relationship;

said logic systems being responsive to said signals generated by said threshold detectors, and said silence detector for generating a signal indicating the word spoken into said first means.

11. The system of claim 10 wherein:

the output signals from the logic systems are connected to a display system for indicating the word spoken into said first means;

said system including an end of word detector having an input connected to the digital output of said silence detector for indicating a silence corresponding to the end of a word;

said system including a control system responsive to the signal output of said end of word detector and the signals generated by said third means for monitoring the operation of the system and generating the appropriate signals to clear and control the operation of said third means and said display means.

12. The system of claim 10 wherein:

said second means includes a timing logic system connected to predetermined threshold device for generating a timing signal in response to a predetermined time interval between the appearance of predetermined threshold signals;

said third means being responsive to said timing signal for identifying a word spoken into said first means.

13. A method for identifying and recognizing spoken words comprising the steps:

transducing spoken words into continuous electrical signals;

filtering signals into discrete bandpass ranges;

inputting said filtered signals directly into a first plurality of threshold devices;

inputting said filtered signal into a plurality of time differentiators;

inputting the output of the time differentiators into a second plurality of threshold devices;

adjusting the trigger levels of said first and second plurality of threshold devices to generate unique sets of digital signals, each of said sets corresponding to a respective spoken word.

14. The method of claim 13, including the steps of:

directly inputting the filtered signal to a formant detector;

inputting the formant detector output signal to a third plurality of threshold devices;

inputting the formant output signal to a plurality of differentiators;

inputting the differentiator output signals to a fourth plurality of threshold devices;

adjusting the trigger levels of the threshold devices to generate sets of digital signals;

selecting the sets of signals from the first, second, third, and fourth plurality of threshold devices to form unique sets of digital signals representing spoken words;

processing said unique sets of signals to identify the spoken words.

* * * * *